United States Patent
Kazama

[19]

[11] Patent Number: 5,822,522
[45] Date of Patent: Oct. 13, 1998

[54] SYSTEM FOR TRANSFERRING DATA THROUGH A COMMUNICATION INTERFACE USING CONTROL INFORMATION IN REQUEST DATA FOR CONTROLLING DATA RECEIVING RATES INDEPENDENT OF THE CPU

[75] Inventor: Yuuzi Kazama, Shizuoka-ken, Japan

[73] Assignee: Kabushiki Kaisha TEC, Shizuoka, Japan

[21] Appl. No.: 630,466

[22] Filed: Apr. 10, 1996

Related U.S. Application Data

[63] Continuation of Ser. No. 121,886, Sep. 17, 1993, abandoned.

[30] Foreign Application Priority Data

Nov. 5, 1992 [JP] Japan ................................. 4-296045
May 17, 1993 [JP] Japan ................................. 5-114993

[51] Int. Cl.[6] .................................................. G06F 13/00
[52] U.S. Cl. ............................... 395/200.13; 395/200.14; 395/849; 395/853
[58] Field of Search .............................. 395/425, 200.13, 395/200.14, 849, 853; 365/519

[56] References Cited

U.S. PATENT DOCUMENTS

| | | | |
|---|---|---|---|
| 4,723,238 | 2/1988 | Isreal et al. ................................. | 370/60 |
| 4,760,406 | 7/1988 | Sato et al. . | |
| 4,779,105 | 10/1988 | Thomson et al. ........................ | 346/154 |
| 4,953,103 | 8/1990 | Suzuki .................................... | 364/519 |
| 4,953,210 | 8/1990 | McGlynn et al. ........................ | 380/48 |
| 4,989,163 | 1/1991 | Kawamata et al. ...................... | 364/519 |
| 5,050,004 | 9/1991 | Morton, Jr. .............................. | 358/405 |
| 5,124,727 | 6/1992 | Yamazaki ................................ | 346/134 |
| 5,305,446 | 4/1994 | Leach et al. ............................. | 395/425 |
| 5,325,516 | 6/1994 | Blomgren et al. ....................... | 395/550 |
| 5,491,720 | 2/1996 | Davis et al. ............................. | 375/222 |

FOREIGN PATENT DOCUMENTS

| | | |
|---|---|---|
| 0 096 407 | 12/1983 | European Pat. Off. . |
| 0 340 972 | 11/1989 | European Pat. Off. . |
| 0 378 427 | 7/1990 | European Pat. Off. . |
| 1-237162 | 9/1989 | Japan . |

OTHER PUBLICATIONS

IBM Technical Disclosure Bulletin, vol. 28, No. 8, Jan. 1986, "Two–Speed Receive Method to Prevent Printer Interface Time–Out", pp. 3717–3719.

*Primary Examiner*—Thomas C. Lee
*Assistant Examiner*—Le Hien Luu
*Attorney, Agent, or Firm*—Oblon, Spivak, McClelland, Maier & Neustadt, P.C.

[57] ABSTRACT

A data processing apparatus which has a communication interface element for connecting between an external apparatus and outputting element. The outputting element outputs the data received from the external apparatus by a normal speed parallel communication through the communication interface element. The data processing apparatus includes a DMAC for connecting between the communication interface element and the outputting element. Designating data which can be included in the received data designates performing a high speed parallel communication. The DMAC is started in response to the designating.

9 Claims, 12 Drawing Sheets

PRINTER

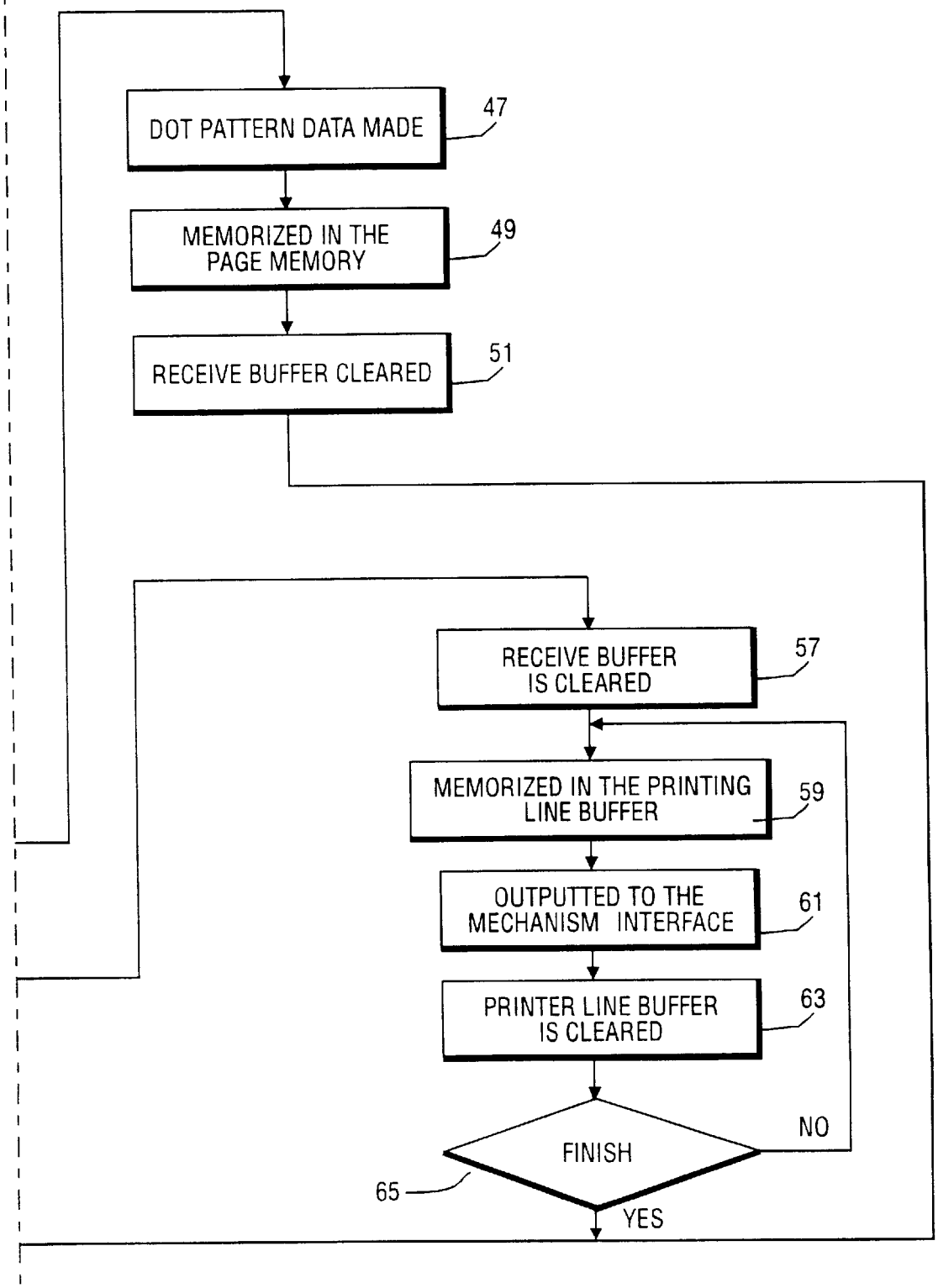
FIG. 3(CONTD.)
(PRIOR ART)
PRINTER

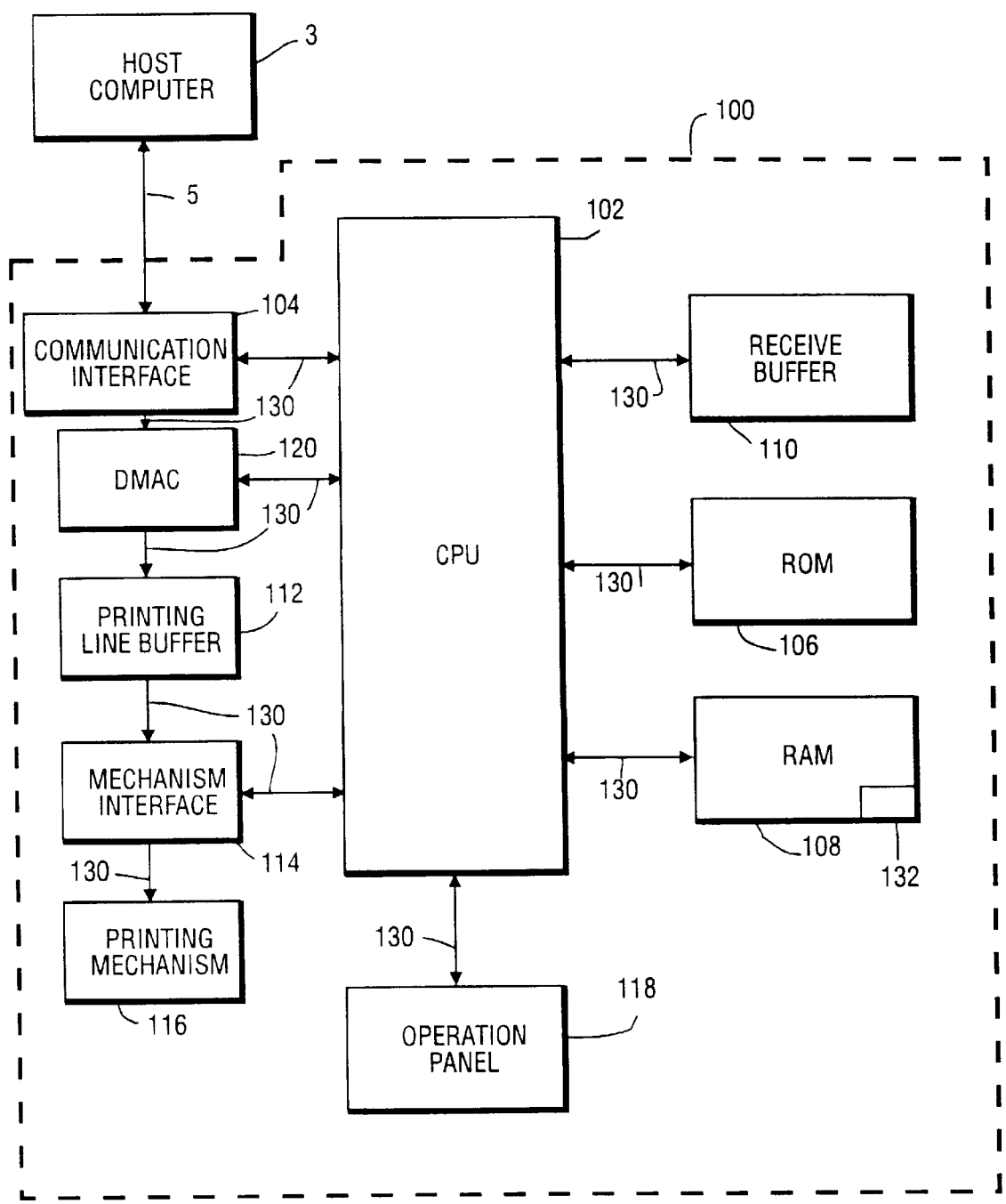

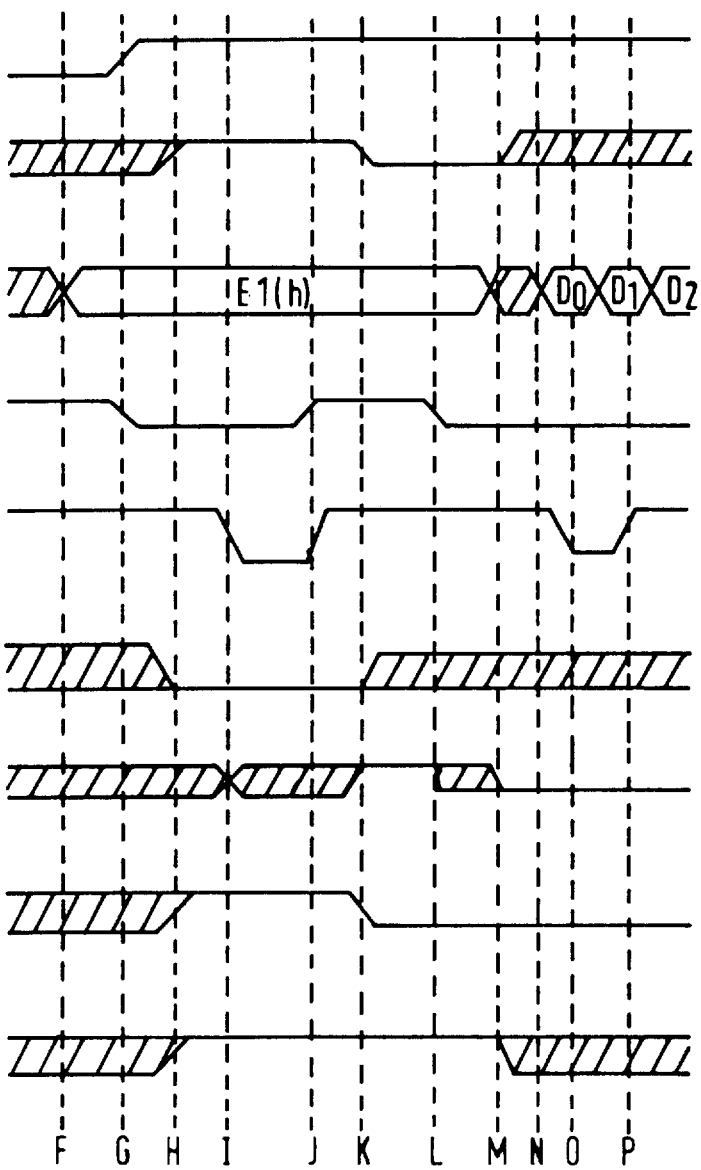

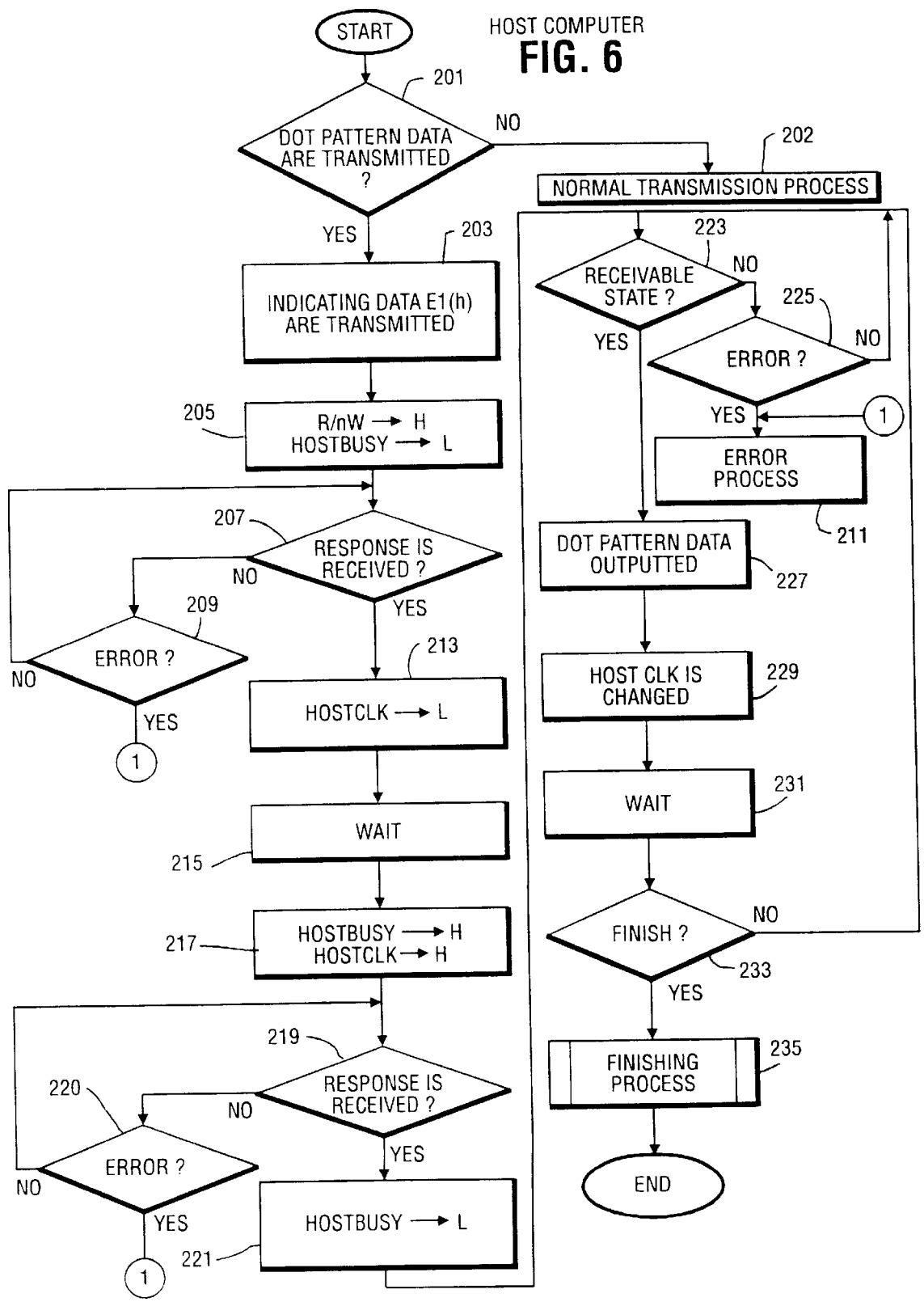

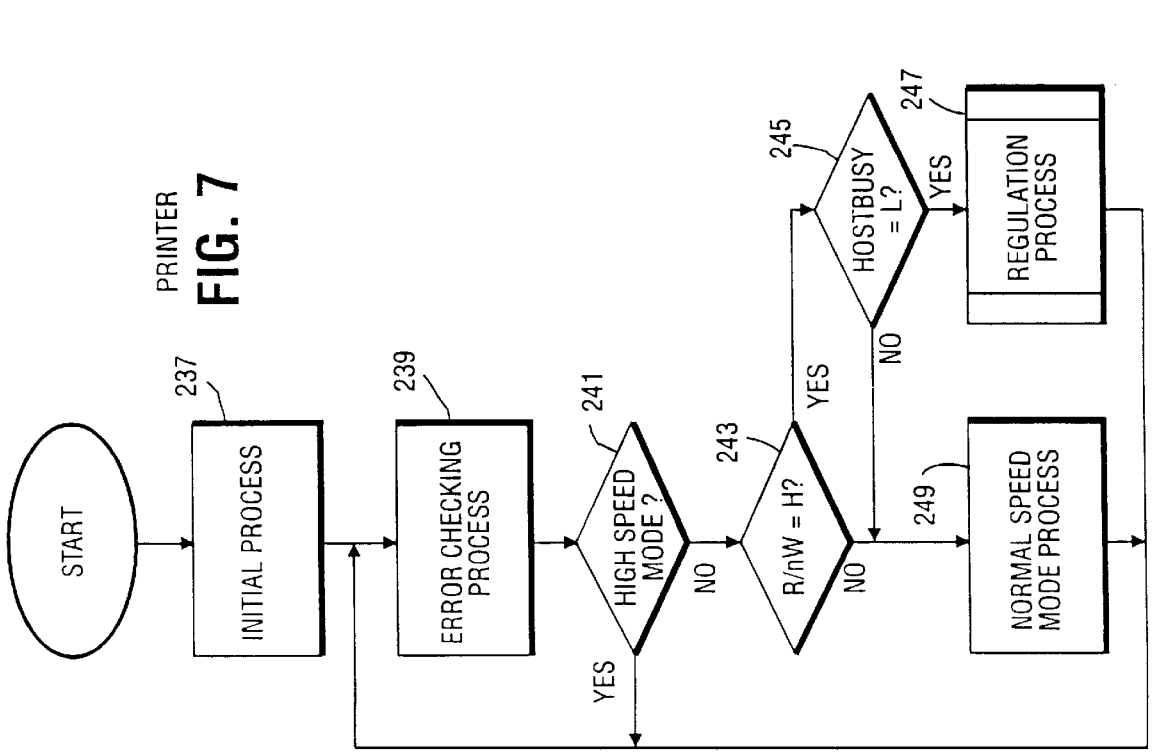

PRINTER

R/nW (j)
(n SELECTION)

ACKDATAREQ (k)
(PERROR)

DATA (8-1) (l)

HOSTBUSY (m)
(nAUTOFD)

HOSTCLK (n)
(nSTROBE)

PRTCLK (o)
(nACK)

PRTBUSY (p)
(BUSY)

nDATAAVAIL (q)
(nFAULT)

XFLAG (r)
(SELECT)

Q R S T U V W X

PRINTER

SYSTEM FOR TRANSFERRING DATA THROUGH A COMMUNICATION INTERFACE USING CONTROL INFORMATION IN REQUEST DATA FOR CONTROLLING DATA RECEIVING RATES INDEPENDENT OF THE CPU

This application is a Continuation of application Ser. No. 08/121,886, filed on Sep. 17, 1993, now abandoned.

BACKGROUND OF THE INVENTION

1. Field of the Invention

The present invention relates to data processing apparatus, for example a printer, a file storage unit or the like, which receives information data from an external apparatus, for example a host computer, and performs a prosecution in accordance with the information data, and, more particularly, to data processing apparatus which can preform data communication by a parallel communication interface and a method of performing the parallel communication.

2. Description of the Related Art

A system in which a data processing apparatus is connected with an external apparatus through a communication line and data communication is performed by a parallel communication interface between the data processing apparatus and the external apparatus, is known as a printer system, a file storage system and the like. Data communication between the data processing apparatus and the external apparatus is typically performed in accordance with a predetermined communication protocol.

Centronics interface protocol is an example of a parallel communication interface protocol. The system in which a printer is connected with a host computer through a communication line and data communication is performed in accordance with the Centronics interface protocol, is explained hereinafter as a related art.

FIG. 1 is a block diagram showing a conventional system. A printer 1 is connected with a host computer 3 through a communication line 5. The printer 1 comprises a CPU 7, a communication interface 9, a ROM 11, a RAM 13, a receive buffer 15, a page memory 17, a printing line buffer 19, a mechanism interface 21, a printing mechanism 23, and an operation panel 25. These circuit elements are connected to one another through bus lines 27 each consisting of an address bus, a data bus and a control bus.

The communication interface 9 performs functions for holding the information data transmitted from the host computer 3 and controlling the data communication between the printer 1 and the host computer 3. The information data is of two types. One type is printing data for printing to a paper. Another type is command data for operating the printer 1. The command data includes a print starting command to designate starting the printing and a size changing command to designate changing the paper size and the like. A data length of these command data can be one or two bytes. The ROM 11 stores control programs for the CPU 7 and a character generater to make a dot pattern data for outputting to the printing mechanism 23. The RAM 13 stores data inputted to the CPU 7 and outputted from the CPU 7. The receive buffer 15 stores information data read from the communication interface 9. The page memory 17 stores the dot pattern data of one page made in accordance with the printing data and the character generater. The printing line buffer 19 stores the dot pattern data of one line stored in the page memory 17 for outputting to the printing mechanism 23. The mechanism interface 21 controls the printing mechanism 23. The operation panel 25 includes various switches and indicators for operating the printer 1.

FIG. 2 is a timing chart explaining the normal data communication. The communication line 5 consists of plural signal lines (not shown). Nine signal lines in the communication line 5 defined by the Centronics interface protocol are explained next.

An nSelection line (a) is used to transmit a signal which indicates whether the host computer 3 is in an on-line state or an off-line state. When a low level signal is outputted from the host computer 3 on the nSelection line (a), the host computer 3 is in the on-line state.

A PError line (b) is used to transmit a signal which indicates a paper empty status in the printer 1. When a high level signal is outputted from the printer 1 on the PError line (b), the paper is empty in the printer 1.

Data line (c) is used to transmit signals which indicate the information data. The Data line (c) consists of eight lines.

An nAutoFd line (d) is used to transmit a signal which indicates a paper feeding unit driving if the paper feeding unit is arranged on the printer 1. When the low level signal is outputted from the host computer 3 on the nAutoFd line (d), the paper feeding unit is driven. In common printers, this line is not used.

An nStrobe line (e) is used to transmit a signal which indicates timing for the communication interface 9 holding the information data. When the low level signal is outputted from the host computer 3 on the nStrobe line (e), the information data is held by the communication interface 9.

An nAck line (f) is used to transmit a signal which indicates a state that printer 1 has normally received the information data. A low level signal on the nAck line (f) indicates the state in which the information data is normally received by the printer 1.

A Busy line (g) is used to transmit a signal which indicates whether the printer 1 is in a receivable state or an unreceivable state. A high level signal on the Busy line (g) represents a state which the printer 1 can receive the information data from the host computer 3.

An nFault line (h) is used to transmit a signal which indicates that a trouble has occurred in the printer 1. When a low level signal is outputted from the printer 1 on the nFault line (h), a state in which a trouble has occurred in the printer 1 is indicated.

A Select line (i) is used to transmit a signal which indicates whether the printer 1 is in an on-line state or off-line state. When a high level signal is outputted from the printer 1 on the Select line (i), the printer 1 is in the on-line state.

Based on the explanation of each signal line described above, a conventional data communication between host computer 3 and printer 1 will now be described. The communication interface 9 outputs the high level signal on the Busy line (g) (indicates the unreceivable state) when the information data is being held by the communication interface 9 and outputs the low level signal on the Busy line (g) (indicates the receivable state) when the information data is not being held by the communication interface 9. As a result, when the information data is held by the communication interface 9, the other information data is not transmitted by the host computer 3.

The operation of the host computer 3 is explained. The level of the signal transmitted on the Busy line (g) is checked to judge whether or not the printer's state is the receivable state. If the signal transmitted on the Busy line (g) is in low level, since the printer 1 is the receivable state, the information data is outputted on the Data line (c) (FIG. 2 timing A) from the host computer 3. The low level signal is outputted on the nStrobe line (e) to hold the information data in the communication interface 9 (FIG. 2 timing B). When the information data is held in the communication interface 9, a high level signal is outputted on the Busy line (g) by the communication interface 9 (FIG. 2 timing C). A response is awaited to confirm the printer 1 has normally received the information data. When the information data is normally received, a low level signal is outputted on the nAck line (f). If the low level signal is not outputted on the nAck line (f) in a prescribed time, a trouble with data communication is recognized. Then, the above-described data transmition process is retried. On the other hand, when the low level signal is outputted on the nAck line (f), it is determined whether or not there are further information data which ought to be transmitted to the printer 1. If there is further information data, the signal transmitted on the Busy line (g) is checked again before transmitting the other information data. If there is no further information data to be transmitted, the transmitting process is terminated.

The operation of the conventional printer 1 is explained next. FIG. 3 is a flow chart illustrating the operating of the conventional printer 1. This flow chart is started by an operater turning on the power to the printer 1. The initial process which includes the ROM checking process, the RAM checking process and the like is executed in step 31. The error checking process which includes the paper empty checking process and the like is executed in step 33. If a trouble is recognized, the trouble is informed to the host computer 3 by changing the signal transmitted on the PError line (b) or the signal transmitted on the nFault line (h). If no trouble is recognized, then whether or not information data is being held in the communication interface 9 is checked in step 35. If the information data is held, the YES-path is taken. Otherwise, the NO-path is taken. When the NO-path is taken in step 35, the error checking process (step 33) is executed again. When the YES-path is taken in step 35, high level signal is outputted on the Busy line (g) to stop information data transmitting from the host computer 3 in step 37. The information data which is being held in the communication interface 9 are stored in the receive buffer 15 in step 39. Low level signal is outputted on the nAck line (f) in a prescribed time to inform of the normal receiving in step 41 (FIG. 2 timing D). Following step 41, low level signal is outputted on the Busy line (g) to inform of the receivable state of printer 1 in step 43 (FIG. 2 timing E). In step 45, whether the information data held in the receive buffer 15 is the command data or is the printing data is judged. If the information data is the command data, the YES-path is taken. Otherwise, the NO-path is taken. When the NO-path is taken in step 45, dot pattern data is made in accordance with the printing data and the character generater (not shown) in step 47. The dot pattern data made is stored in the page memory 17 in step 49. The receive buffer 15 is then cleared in step 51.

When the YES-path is taken in step 45, whether or not the command data is the printing starting command is judged in step 53. If the command data is the printing starting command, the YES-path is taken. Otherwise, the NO-path is taken. When the NO-path is taken in step 53, the process in accordance with the command data is executed in step 55. When the YES-path is taken in step 53, the receive buffer 15 is cleared in the step 57. The dot pattern data of one line is read from the dot pattern data memorized in the page memory 17 and are memorized in the printing line buffer 19 in step 59. The one line dot pattern data in the printing line buffer 19 is outputted to the mechanism interface 21 in step 61. As a result, printing is performed by the printing mechanism 23, and then the printing line buffer 19 is cleared in step 63. Whether or not the all dot pattern data memorized in the page memory 17 is outputted is judged in step 65. Until all of the dot pattern data is outputted, steps 59 to 65 are repeated.

As mentioned above, the data communication and printing based on the communication is performed. It is desirable to terminate these processes in the short time because the operator waits for the completion. However, wnen a large volume of printing data is transmitted to the printer from the host computer, the operator should wait for a relatively long time because the data communication takes much time.

If the host computer makes dot pattern data, it may be possible to eliminate such a function of producing dot pattern data from the printer. However, in general, dot pattern data is more voluminous than the printing data, e.g., ASCII data. The above conventional system is not practical because data communication takes an excessively long time.

SUMMARY OF THE INVENTION

Accordingly, it is an object of the invention to provide data processing apparatus having a first function which may execute data communication at a normal speed normal speed mode) and a second function which may execute data communication at a high speed (high speed mode). The data processing apparatus may select between the normal speed mode and the high speed mode as the occasion demands.

In order to achieve the above object of the present invention, there is provided a data processing apparatus which has a communication interface element for connecting with an external apparatus, a communication means for receiving by parallel communication data from the external apparatus in the communication interface element and buffer means for storing the data for further processing, comprising means for transferring at high speed the data received from the communication interface element to the buffer means, the data from the external apparatus being received as high speed parallel communication during the high speed transfer, means for identifying in one of the received data and an externally applied command a designating data which designates performing the high speed transfer, means for starting the high speed transfer in response to the designating data.

BRIEF DESCRIPTION OF THE DRAWINGS

These and other objects and advantages of this invention will become more apparent and more readily appreciated from the following detailed description of the presently preferred exemplary embodiments of the invention taken in conjunction with the accompanying drawings wherein:

FIG. 4 is a block diagram of a printing system of an embodiment of the present invention;

FIGS. 5(A) through 5(I) are timing charts showing the data communication of an embodiment of the present invention when the data communication mode changes to a high speed mode from a normal speed mode;

FIG. 6 is a flow chart showing the operation of a host computer;

FIG. 7 is a flow chart showing the main operation of a printer of embodiment of the present invention;

FIG. 9 is a flow chart showing the high speed printing process of the printer of an embodiment of the present invention;

DETAILED DESCRIPTION OF THE PREFERRED EMBODIMENTS

Figure 1:
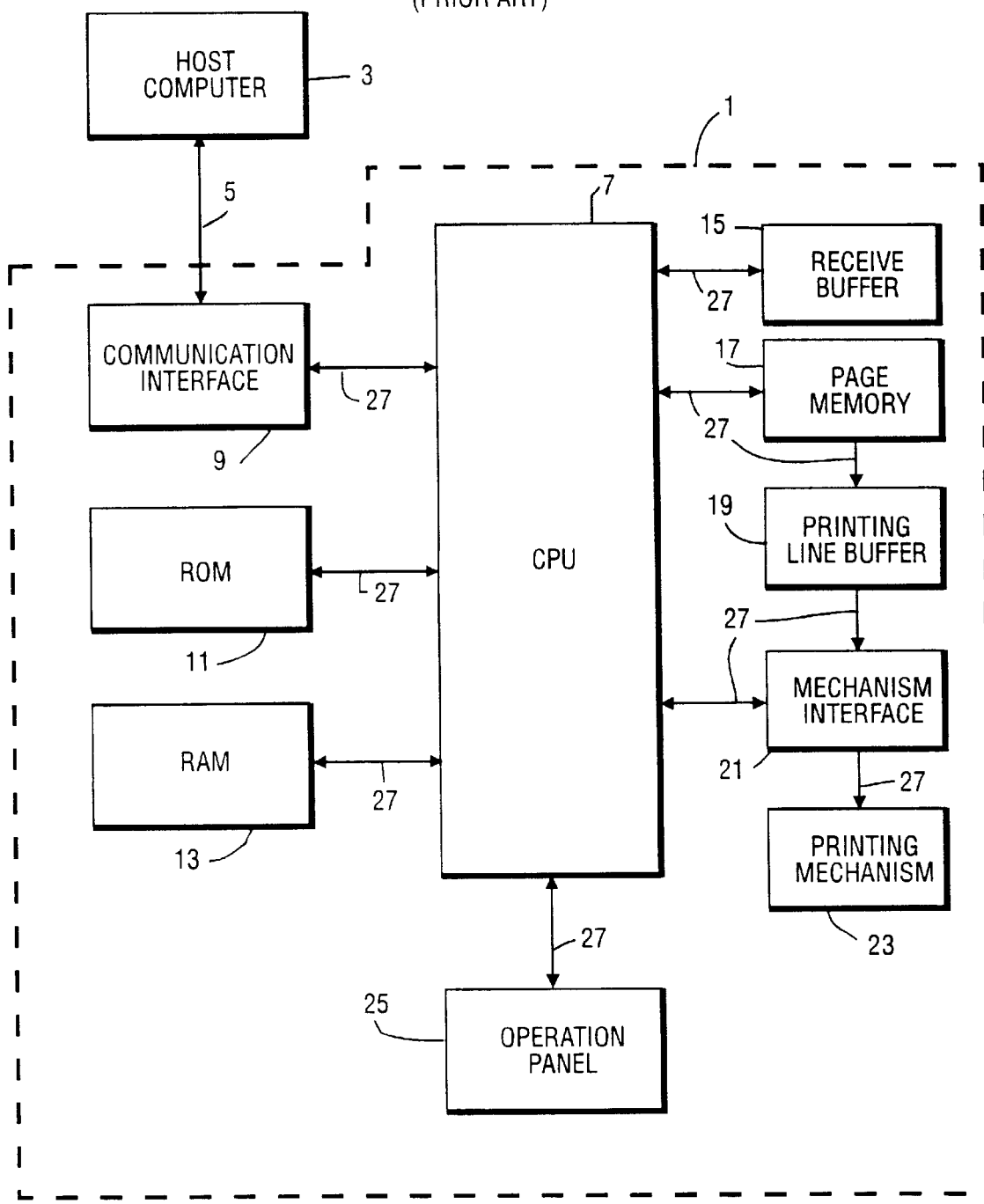
FIG. 1 is a block diagram of a conventional printing system.

Preferred embodiments of the present invention will now be described in more detail with reference to the accompanying drawings. An embodiment of the present invention will now be described with reference to FIGS. 4 to 12. A system in this embodiment is explained as a printing system in which dot pattern data is generated at a host computer and is transmitted to the printer acting as a data processing apparatus. The Centronics interface protocol is used as a parallel communications interface. When the dot pattern data is transmitted to the printer, the data communication is performed in a high speed mode, and when the command data is transmitted to the printer, the data communication is performed in a normal speed mode.

FIG. 4 is a block diagram of the printing system of an embodiment of the present invention. Before the description proceeds, it is noted that like parts are designated by like reference numerals throughout the accompanying drawings, and therefore the detailed descriptions thereof are not repeated.

A printer 100 is connected with the host computer 3 through the communication line 5. The printer 100 comprises a CPU 102, a communication interface 104, a ROM 106, a RAM 108, a receive buffer 110, a printing line buffer 112, a mechanism interface 114, a printing mechanism 116, an operation panel 118 and a DMAC (Direct Memory Access Controller) 120. These circuit elements are connected to one another through bus lines 130 each consisting of an address bus, a data bus and a control bus. In this printing system, the dot pattern data is transmitted to the printer 100 from the host computer 3. Therefore, the printer 100 does not need a page memory and a character generator to make the dot pattern data.

The communication interface 104 performs functions for holding information data transmitted from the host computer 3 and controlling the data communication between the printer 100 and the host computer 3. The ROM 106 stores control programs for the CPU 102. The RAM 108 stores data inputted to the CPU 102 and outputted from the CPU 102. The receive buffer 110 stores command data read from the communication interface 104. The printing line buffer 112 stores one line dot pattern data for outputting to the printing mechanism 116. The mechanism interface 114 controls the printing mechanism 116. The operation panel 118 includes various switches for operating the printer 100.

The DMAC 120 can function to convey data to a first memory from a second memory independent from control by the CPU 102. The printing line buffer 112 is connected with the communication interface 104 through the DMAC 120. The DMAC 120 has a counter (not shown) to count the number of the dot pattern data which convey to the printing line buffer 112. The DMAC 120 informs the CPU 102 by outputting a first interrupt signal (not shown) when the number of the dot pattern data reaches a number corresponding to one page.

The RAM 108 includes a flag area 132 to memorize flag data which indicates preparation for a high speed mode. The printing line buffer 112 informs the CPU 102 by outputting a second interrupt signal (not shown) when the one line dot pattern data is set in the printing line buffer 112 by the DMAC 120.

FIGS. 5(j) through 5(r) are timing charts showing the data communication of the present invention when the data communication mode is changed to the high speed mode from the normal speed mode. In the Centronics interface, when the data communication mode is changed to another data communication mode, for example, the data communication mode is changed to another mode for transmitting data from the external apparatus to the data processing apparatus, operation of the signal lines is defined in a standard published by the IEEE (The Institute of Electrical and Electronics Engineers, Inc). In this embodiment, when the data communication mode is changed to the high speed mode from the normal speed mode, one part of the operation of the signal lines is performed in accordance with the standard. However, features of operation of the high speed mode are not defined in the standared that.

When the data communication mode is changed to the high speed mode, the names and the functions of the signal lines are changed.

The nSelection line (a) is changed to a R/nW line (j). The PError line (b) is changed to a AckDataReq line (k). The nAutoFd line (d) is changed to a HostBusy line (m). The nStrobe line (e) is changed to a HostClk line (n). The nAck line (f) is changed to a PrtClk line (o). The Busy line (g) is changed to a PrtBusy line (p). The nFault line (h) is changed to a nDataAvail line (q). The Select line (i) is changed to a XFlag line (r).

The XFlag line (r) is used to transmit a signal which represents that the data communication mode is changing from the normal speed mode to the high speed mode. When a high level signal is outputted from the printer 100 on the XFlag line (r), the data communication mode is changing to the high speed mode. The above descrived signal lines are used as the particular signal lines when the data communication mode is the high speed mode, and are used as the conventional signal lines when the data communication mode is the normal speed mode.

FIG. 6 is a flow chart showing the operation of a host computer 3. When the host computer 3 is operated by the operator as transmitting the information data, whether the information data is the dot pattern data or the command data is judged in step 201. If the information data is command data, the NO-path is taken. Otherwise, the YES-path is taken. The dot pattern data is previously made. When the host computer 3 transmits the dot pattern data of one page, the data communication by the host computer 3 are completed.

Figure 2:
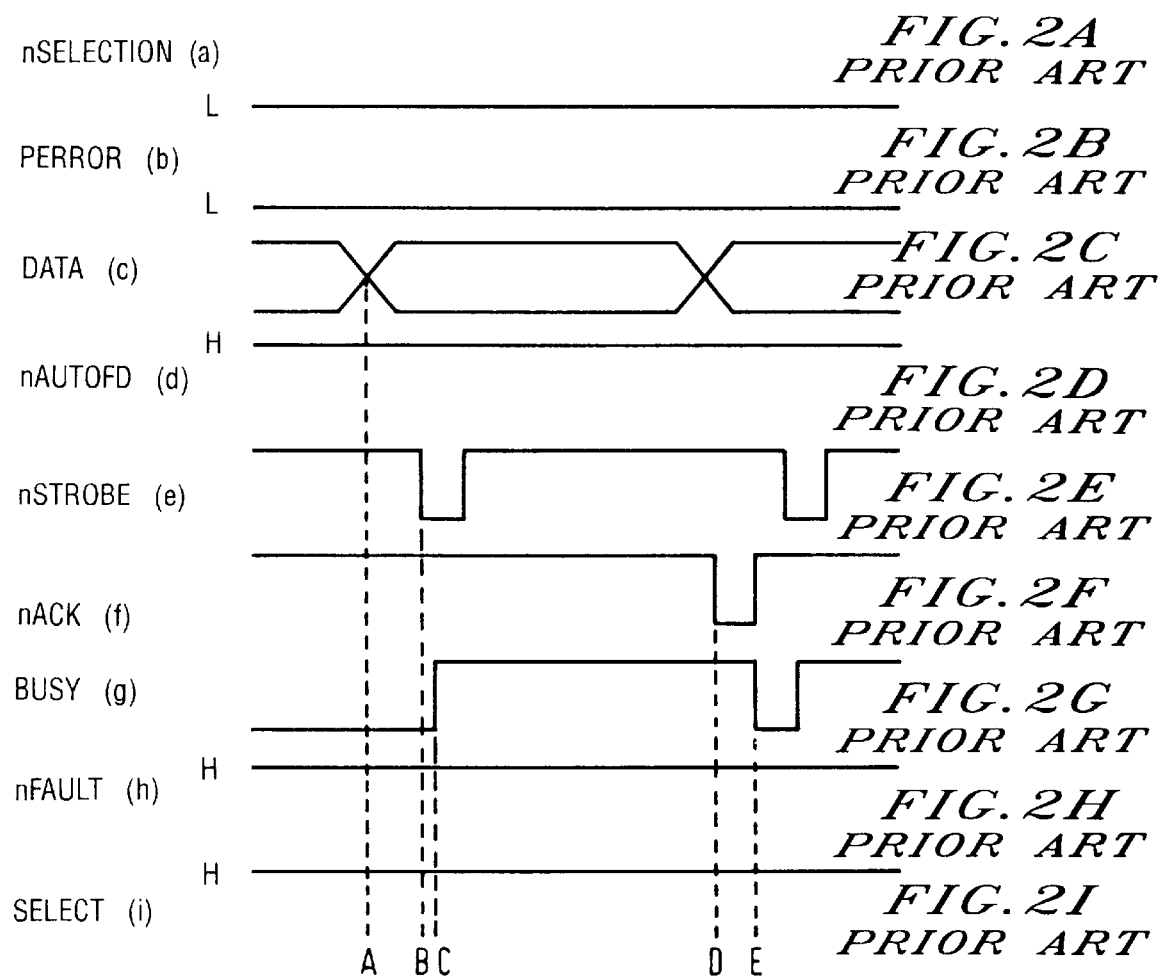
FIGS. 2(a) through 2(i) are timing charts showing the data communication of the conventional printing system.
Figure 3:
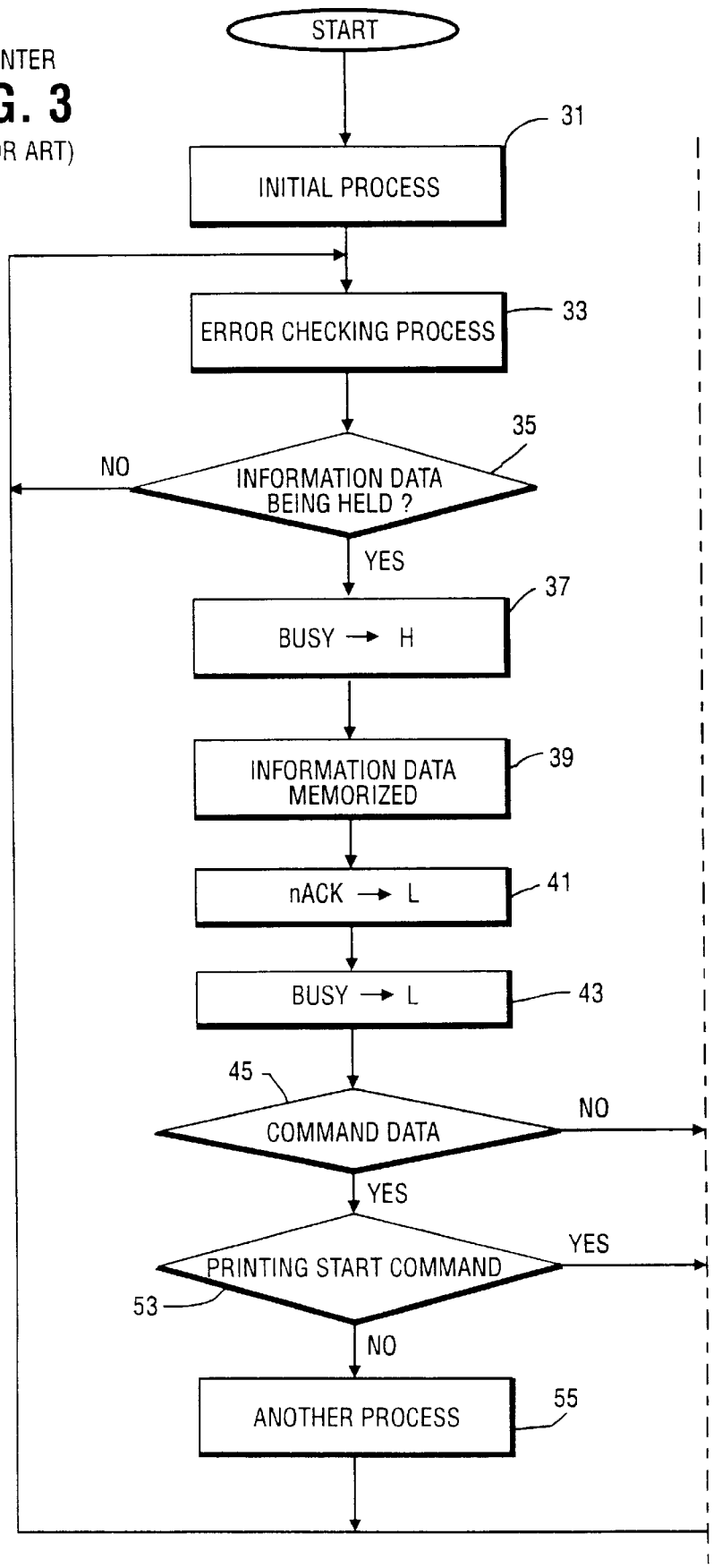
FIG. 3 is a flow chart showing the operation of a conventional printer.

When the NO-path is taken in step 201, the data communication by the normal speed mode is executed in step 202. The process of the step 202 corresponds to conventional data communication. As shown in FIG. 2, the signal transmitted on the Busy line (g) is checked. If the signal transmitted on the Busy line (g) is low level, the command data is outputted on the Data line (c). The low level signal is outputted on the nStrobe line (e) in a prescribed time. The response from the printer 100 is awaited.

When the YES-path is taken in step 201, the signal process is executed as shown in FIG. 5. Designating data E1(h) which designates a mode change from the normal speed mode to the high speed mode are outputted on the Data line (1) in step 203 (FIG. 5 timing F). A high level signal is outputted on the R/nW line (j). A low level signal is outputted on the HostBusy line (m) in step 205 (FIG. 5 timing G). Each signal designates changing the data communication mode. A response from the printer 100 is awaited in step 207. If the response from the printer 100 is received, the YES-path is taken. The printer 100 responds to the host computer 3 by using the AckDataReq line (k), the PrtClk line (o), the nDataAvail line (q), and the XFlag line (r). The XFlag line (r) transmits a signal which represents the mode is changing from the normal speed mode to the high speed mode. If response from the printer 100 is not received in a prescribed time in step 207, the error process is executed in the steps 209, 211.

When the YES-path is taken in step 207, the low level signal is outputted on the HostClk line (n) to hold the designating data E1(h) in the communication interface 104 in step 213 (FIG. 5 timing I). After a prescribed time, the high level signal is outputted on the HostBusy line (m) and thle HostClk line (n) to inform receiving the response in step 215, 217 (FIG. 5 timing J). A response from the printer 100 is awaited in step 219. If the response from the printer 100 is received, the YES-path is taken. The printer 100 responds to the host computer 3 by using the AckDataReq line (k), the PrtBusy line (p) and the nDataAvail line (g). When the YES-path is taken in step 219, the low level signal is outputted on the HostBusy line (m) in step 221 (FIG. 5 timing L). The signal transmitted on the PrtBusy line (p) is checked to judge the printer's state which is the receivable state or the unreceivable state in step 223. If the signal transmitted on the PrtBusy line (p) is set to the low level by the printer 100, the YES-path is taken. If the signal transmitted on the PrtBusy line (p) is not set to the low level by the printer 100 in a prescribed time, the error process is executed in the steps 225 and 211. When the YES-path is taken in step 223, the dot pattern data is outputted on the Data lines (1) in step 227 (FIG. 5 timing N).

The data communication between the host computer 3 and the printer 100 starts, as the high speed mode, from this time. The signal transmitted on the HostClk line (n) is operated to hold the dot pattern data in the communication interface 104 in step 229 (FIG. 5 timing 0). After a prescribed time, whether or not the dot pattern data of one page were outputted is checked in step 233. If the dot pattern data of one page is outputted, the YES-path is taken. Otherwise, step 223 is executed again to output the next dot pattern data (the signal transmitted on the PrtBusy line (p) is checked). The high level signal is outputted on the PrtBusy line (p) when the printing line buffer 112 reaches a full state by receiving the plural dot pattern data. When the YES-path is taken in step 233, a finishing process is executed to return to the normal speed mode in step 235. The finishing process is explained later with respect to FIG. 11.

FIG. 7 is a flow chart showing the main operation of a printer 100. This flow chart is started by an operater turning on the power of printer 100. The initial process which includes the ROM checking process, the RAM checking process and the like is executed in step 237. The error checking process which includes the paper empty checking process and the like is executed in step 239. In the normal speed mode, if trouble is recognized, the trouble state is transmitted to the host computer 3 by changing the signal transmitted on the PError line (b) or the signal transmitted on the nFault line (h) shown in FIG. 2. In the high speed mode, if trouble is recognized, the trouble state is transmitted to the host computer 3 by changing the signal transmitted on the nDataAvail line (q) shown in FIG. 5. If trouble is not recognized, the flag area 132 is checked to judge the current data communication mode in step 241.

If the current data communication mode is the high speed mode (1 is memorized as the flag data in the flag area 132), the YES-path is taken. Otherwise, the NO-path is taken. When the YES-path is taken in step 241, the error checking process (step 239) is executed again because the data communication is executed by the DMAC. When the NO-path is taken in step 241, the level of the signal transmitted on the R/nW line (j) and the signal transmitted on the HostBusy line (m) are checked to recognize changing to the high speed mode in steps 243, 245. If the level of the signal transmitted on the R/nW line (j) is not a high level, the NO-path is taken. If the level of a signal transmitted on the HostBusy line (m) is not low level, the NO-path is taken. When the YES-path is taken in step 243 and step 245, a regulation process mode is executed (in step 247) to change to the high speed mode from the normal speed mode.

Otherwise, the data communication is performed by the normal speed mode in step 249. The process of the step 249 is the same as the above described conventional process. The communication interface 9 is checked whether or not the command data is being held therein. If the command data is being held, a high level signal is outputted on the Busy line (g). The command data held by the communication interface 104 are stored in the receive buffer 110. A low level signal is outputted on the nAck line (f) to inform of the normal receipt in a prescribed time (FIG. 2 timing D). A low level signal is outputted on the Busy line (g) to inform of the receivable state (FIG. 2 timing E). The process for printing is executed in accordance with the command data.

Figure 8:
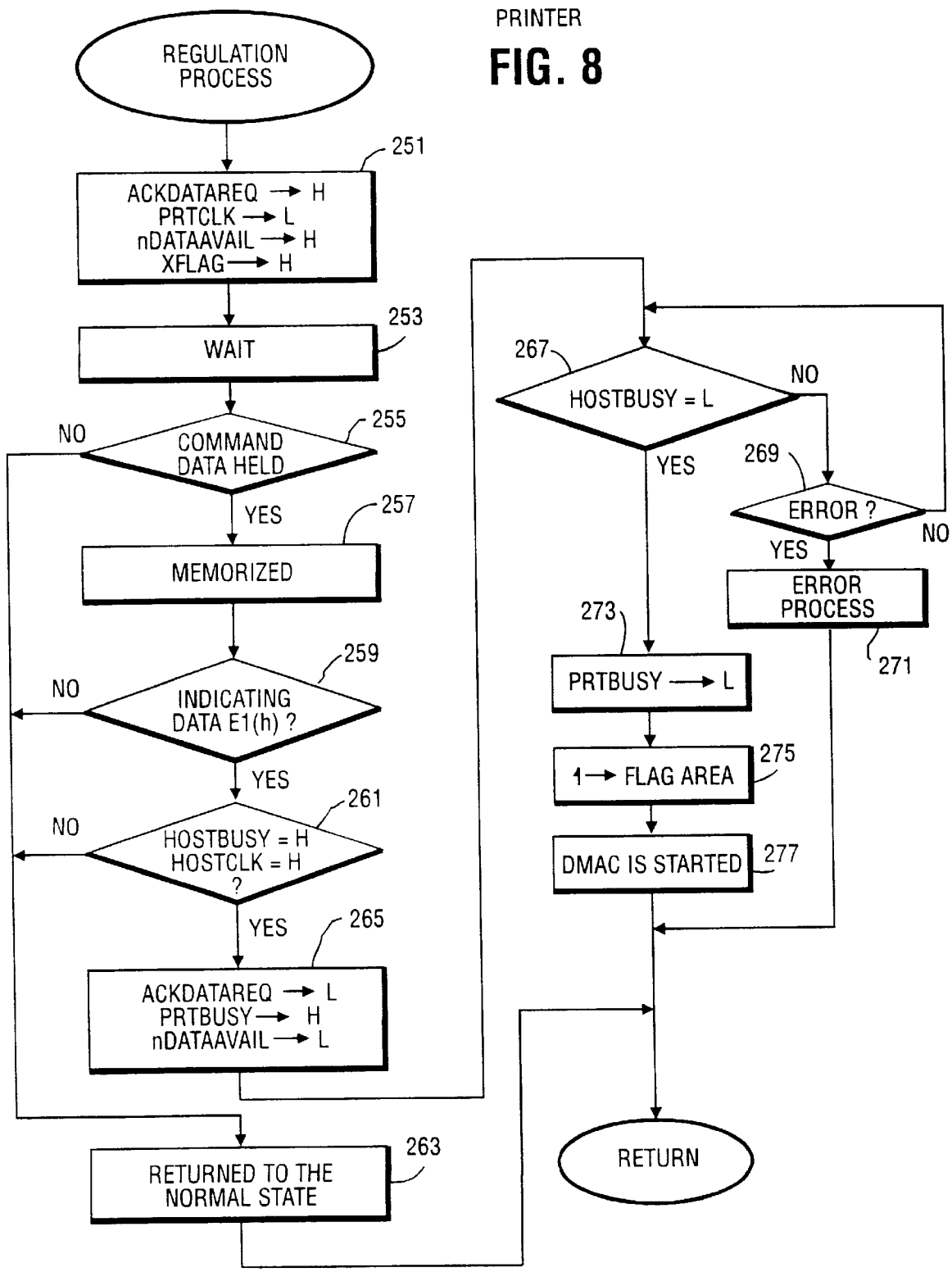
FIG. 8 is a flow chart showing the regulation process of the printer of an embodiment of the present invention.
Figure 10A:
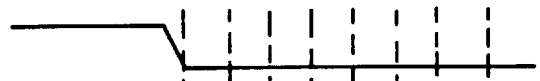
FIGS. 10(A) through 10(I) are timing charts showing the data communication of an embodiment of the present invention when the data communication mode changes to the normal speed mode from the high speed mode.
Figure 10B:
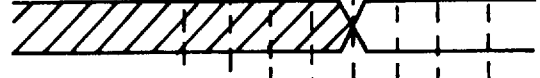
Figure 10C:
Figure 10D:
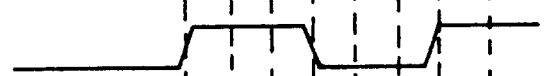
Figure 10E:
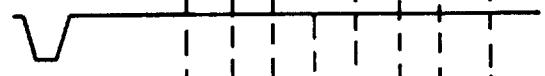
Figure 10F:
Figure 10G:
Figure 10H:
Figure 10I:
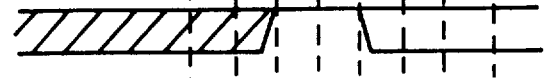

FIG. 8 is a flow chart showing the regulation process to change the mode of the printer from the normal speed mode to the high speed mode (FIG. 7 step 247). The signal on the lines of the communication line 5 are controled at this process as shown in FIG. 5. High level signals are outputted on the AckDataReq line (k), nDataAvail line (q) and XFlag line (r). Further, the low level signal is outputted on the PrtClk line (o) for responding to the host computer 3 in step 251 (FIG. 5 timing H). After a prescribed time, whether or not the command data is being held in the communication interface 104 is checked in steps 253, 255. If the command data is held, the YES-path is taken. Otherwise, the NO-path is taken. When the YES-path is taken in step 255, the command data is memorized in the receive buffer 110 in step 257. Whether or not the designating data E1(h) which designates changing to the high speed mode has been memorized in the receive buffer 110 as the command data is checked in step 259. If the designating data El(h) is memorized, the YES-path is taken. Otherwise, the NO-path is taken. When the YES-path is taken in step 259, whether or not the signal transmitted on the HostBusy line (m) and the signal transmitted on the HostClk line (n) are high level is checked in step 261. If the signal transmitted on the HostBusy line (m) and the signal transmitted on the HostClk line (n) are high level, the YES-path is taken. Otherwise, the NO-path is taken. When the NO-path is taken in steps 255, 259 or 261, the lines of communication line 5 are returned to the state of the normal speed mode in step 263.

When the YES-path is taken in step 261, the low level signals are outputted on the AckDataReq line (k) and the nDataAvail line (q). Further, the high level signal is outputted on the PrtBusy line (p) in step 265 (FIG. 5 timing K). Whether or not the low level signal has been outputted on the HostBusy line (m) by the host computer 3 is judged in step 267. If the signal transmitted on the HostBusy line (m) is low level, the YES-path is taken. If the signal transmitted on the HostBusy line (m) has not been raised to the high level by the host computer 3 in a prescribed time, trouble is recognized in step 269. The error process is executed in step 271. When the YES-path is taken in step 267, the low level signal is outputted on the PrtBusy line (p) to inform of the receivable state to the host computer 3 in step 273 (FIG. 5 timing M). The flag data (1) which indicates the high speed mode is memorized in the flag area 132 in step 275. The DMAC 120 begins conveying the data to the printing line buffer 112 from the communication interface 104 in step 277. The process of the CPU 102 is returned to the main process (shown in FIG. 7 step 239). The data communication is executed in the high speed mode from this time.

The DMAC 120 conveys the dot pattern data held in the communication interface 104 to the printing line buffer 112 and counts dot pattern data conveyed. The dot pattern data is stored in the printing line buffer 112 by the DMAC 120 in accordance with the level of the signal transmitted on the HostClk line (n) changing (FIG. 5 timing 0, P). The dot pattern data is transmitted to the printing line buffer 112 independent of control by the CPU 102. Therefore, the dot pattern data can be transmitted to the printing line buffer 112 at high speed.

When the number of the dot pattern data reaches the number of the dot pattern data corresponding to one page, the first interrupt signal (not shown) is outputted from the DMAC 120 to the CPU 102. A high speed mode finishing processs for returning to the normal speed mode is executed by the CPU 102 in response to the first interrupt signal. The high speed mode finishing process is explained later with respect to FIG. 12. When the dot pattern data of one line are set in the printing line buffer 112 by the DMAC 120, the second interrupt signal (not shown) is outputted from the printing line buffer 112 to the CPU 102. A high speed printing process for outputting the dot pattern data to the mechanism interface 114 is executed by the CPU 102 in response to the second interrupt signal.

FIG. 9 is a flow chart showing the high speed printing process of the printer 100. This process is started in response to the second interrupt signal. The high level signal is outputted on the PrtBusy line (p) in step 279. The dot pattern data stored in the printing line buffer 112 are outputted to the mechanism interface 114 to print in step 281. The dot pattern data in the printing line buffer 112 is cleared in step 283. The low level signal is outputted on the PrtBusy line (p) in step 285. The process of the CPU 102 is returned to the main process again (shown in FIG. 7). The dot pattern data is transmitted again from the host computer 3 to the communication interface 104 through Data line (l) in response to the low level signal transmitted on the PrtBusy line (p). The DMAC 120 conveys the dot pattern data held in the communication interface 104 to the printing line buffer 112 and counts dot pattern data conveyed again.

The finishing process for returning to the normal speed mode is explained next. In the Centronics interface, when the data communication mode is returned to the former data communication mode, operation of the signal lines are defined by a standard of the IEEE, as previously noted. In this embodiment, when the data communication mode is returned to the normal speed mode from the high speed mode, one part of the operation of the signal lines are performed in accordance with the IEEE standard. However, an operation relating to the high speed mode is not defined in the standard.

FIGS. 10(j) through 10(r) are timing charts showing the data communication when the data communication mode is changed to the normal speed mode from the high speed mode.

Figure 11:
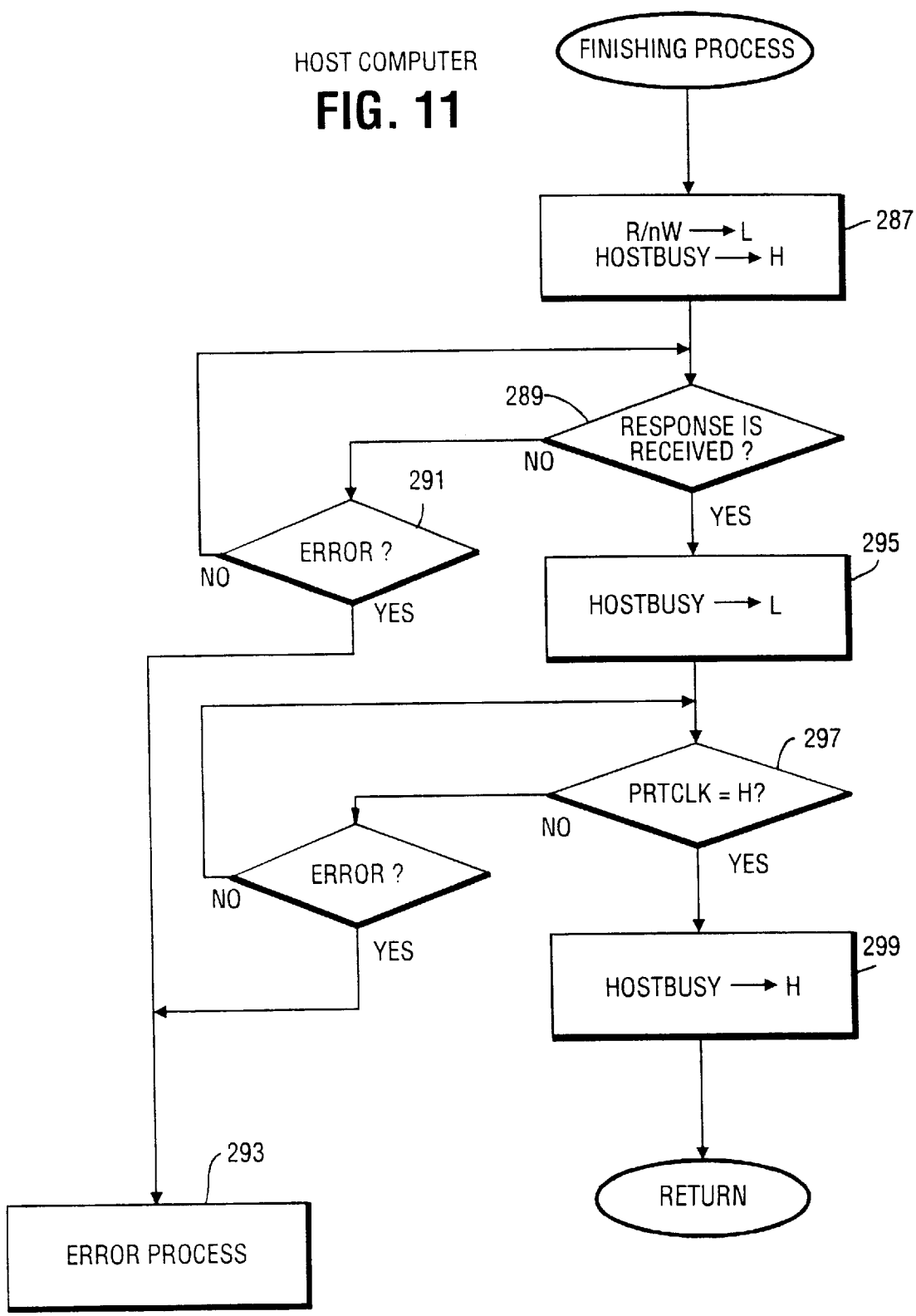
FIG. 11 is a flow chart showing the finishing process of the host computer.

FIG. 11 is a flow chart showing the finishing process of the host computer 3 (FIG. 6 step 235). When the YES-path is taken in step 233 in FIG. 5, the low level signal is outputted on the R/nW line (j). Further the high level signal is outputted on the HostBusy lIne (m) (FIG. 10 timing Q). The occurrence of these states of the signals on the R/nW line (j) and the HostBusy line (m) indicate the return to the normal speed mode. A response from the printer 100 is awaited in step 289. If the response from the printer 100 is received, the YES-path is taken. The printer 100 responds to the host computer 3 by using the PrtClk line (o), the nDataAvail line (q), and the XFlag line (r). If the response from the printer 100 is not received in a prescribed time, the error process is executed in the steps 291,293.

When the YES-path is taken in step 289, the low level signal is outputted on the HostBusy line (m) in step 295 (FIG. 10 timing T). A response from the printer 100 is awaited in step 297. If the response from the printer 100 is received, the YES-path is taken. The printer 100 responds to the host computer 3 by using the PrtClk line (o). When the YES-path is taken in step 297, the high level signal is outputted on the HostBusy line (m) in step 299 (FIG. 10 timing W).

Figure 12:
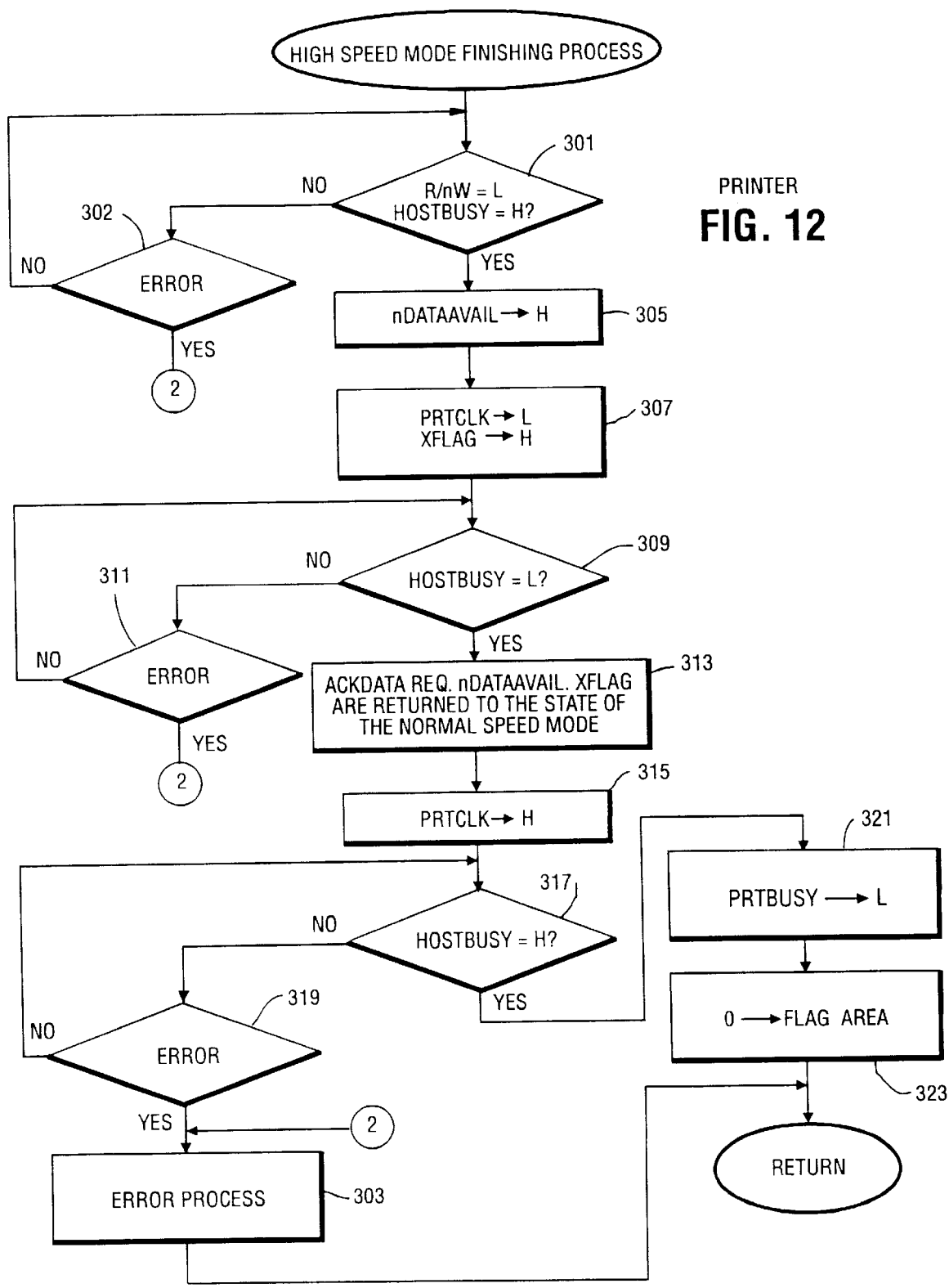
FIG. 12 is a flow chart showing the high speed mode finishing process of the printer of an embodiment of the present invention.

FIG. 12 is a flow chart showing the high speed mode finishing process of the printer 100. This process is started in response to the first interrupt signal. The level of the signal transmitted on the R/nW line (j) and the signal transmitted on the HostBusy line (m) are checked to judge returning to the normal speed mode in step 301. If the signal transmitted on the R/nW line (j) is low level and the signal transmitted on the HostBusy line (m) is high level, then the YES-path is taken. If the levels of the signal transmitted on the R/nW line (j) and the signal transmitted on the HostBusy line (m) are not changed in a prescribed time, the error process is prosecuted in the steps 302, 303. When the YES-path is taken in step 301, the high level signal is outputted on the nDataAvail line (q) in step 305 (FIG. 10 timing R). After a prescribed time, the low level signal is outputted on the PrtClk line (o) and the high level signal is outputted on the XFlag line (r) in step 307 (FIG. 10 timing S). The level of the signal transmitted on the HostBusy line (m) is judged in step 309. If the level of the signal transmitted on the HostBusy line (m) is low, the YES-path is taken. If the level of the signal transmitted on the HostBusy line (m) is not changed to the low level by the host computer 3 in a prescribed time, the error process is executed in the steps 311, 303. When the YES-path is taken in step 309, the levels of the signal transmitted on the AckDataReq line (k), the signal transmitted on the nDataAvail line (q) and the signal transmitted on the XFlag line (r) are returned respectively to the state of the normal speed mode in step 313 (FIG. 10 timing U). After a prescribed time, the high level signal is outputted on the PrtClk line (o) in step 315 (FIG. 10 timing V). The level of the signal transmitted on the HostBusy line (m) is judged in step 317. If the level of the signal transmitted on the HostBusy line (m) is high, the YES-path is taken. If the level of the signal transmitted on the HostBusy line (m) is not raised to the high level by the host computer 3 in a prescribed time, the error process is prosecuted in the steps 319, 303. When the YES-path is taken in step 317, the low level signal is outputted on the PrtBusy line (p) in step 321 (FIG. 10 timing X). The flag data (1) in the flag area 132 is cleared (0) in step 323. The process of the CPU 102 is returned to the main process again (shown in FIG. 7). The data communication is performed in the normal speed mode from this time.

According to this embodiment, the data processing apparatus may perform the high speed data communication as the occasion demands. Accordingly, when a large volume of data is transmitted to the data processing apparatus from the external apparatus, the wait time of the operator is reduced.

This embodiment exemplifies the printer as the data processing apparatus but can be applied to other data processing apparatus which conducts parallel communications with the CPU, for example, a file storage unit and the like.

In a printer which has a page memory and a character generator, the communication interface connecting with the receive buffer through the DMAC may execute the high speed data communication in regard to the conventional printing data. In this embodiment, the designation of changing the data communication mode is executed by the host computer, however, it may instead be executed at the operation panel.

The present invention has been described with respect to a specific embodiment. However, other embodiments based on the principles of the present invention should be obvious to those of ordinary skill in the art. Such embodiments are intended to be covered by the claims.

What is claimed is:

1. A data processing apparatus which has a communication interface element, through which control information data is received by parallel communication at a first speed from an external apparatus for connecting with said external apparatus, and buffer means for storing information data for further processing, the apparatus comprising:

identifying means for identifying a request data contained within the control information data, the request data designating performing a transfer of the information data from the external apparatus to the communication interface element at a second speed greater than the first speed; and transferring means responsive to the request data contained within the control information data and independent of a control from a controller of the data processing apparatus for transferring at the second speed the information data received at the communication interface element from the external apparatus to the buffer means.

2. An apparatus as defined in claim 1, wherein the transferring means includes means for outputting directly the information data to the buffer means.

3. An apparatus as defined in claim 2, wherein the direct outputting means includes a DMAC connected between the communication interface element and the buffer means.

4. An apparatus as defined in claim 1, wherein the transferring means includes means for outputting to the external apparatus a signal indicating commencement of the high speed transfer.

5. A data processing apparatus which has a communication interface element, through which information data is received by parallel communication at a first speed from an external apparatus for connecting with said external apparatus, and buffer means for storing the information data for further processing, the apparatus comprising:

means for transferring at a second speed greater than the first speed the information data received from the external apparatus at the communication interface element to the buffer means;

means for identifying in one of the received information data and an externally applied command a first designating data which designates switching to the first speed parallel communication from the second speed parallel communication and a second designating data which designates performing the second speed parallel communication; means for starting the first speed parallel communication in response to the first designating data; and means for starting the second speed parallel communication in response to the second designating data contained within the received information data and independent of a control from a controller of the data processing apparatus.

6. A method of changing from a first speed parallel communication to a second speed parallel communication, comprising the steps of:

identifying in one of received information data and an externally applied command a designating data which designates performing the second speed parallel communication;

starting the second speed parallel communication in response to the designating data contained within the received information data and independent of a control from a controller; and transferring at the second speed the information data received at the communication interface element from an external apparatus to buffer means, the information data from the external apparatus being received at the second speed greater than the first speed during the second speed transfer.

7. A data processing apparatus which has a parallel communication interface element having a plurality of parallel signal lines, through which control information data is received from an external apparatus on the basis of an interface protocol, for connecting with said external apparatus, the data processing apparatus comprising:

means for receiving at the communication interface element communication data from the external apparatus in one of a first speed mode wherein the data is transmitted at a first speed based on the interface protocol and a second speed mode wherein the data is transmitted at a second speed greater than the first speed based on the interface protocol; and processing means responsive to signals on the plurality of parallel signal lines within the information data and independent of a control from a controller of the data processing apparatus for executing a transition process wherein an indicating signal which represents the speed mode is changing from the first speed mode to the second speed mode is outputted to the external apparatus when request for transition from the first speed mode to the second speed mode is issued from the external apparatus.

8. An apparatus according to claim 7, wherein the information data from the external apparatus has a request data (E1(h)) which designates the second speed mode, and the processing means includes means for carrying out data communication with the external apparatus in the second speed mode in response to the request data after execution of the transition process.

9. A printing apparatus which has a communication interface element for connecting with an external apparatus, and a communication means for receiving, at a first speed, control data indicating that the external apparatus will transmit command data or dot pattern data to be used for printing, the apparatus comprising:

means for identifying whether the control data indicates that the external apparatus will transmit the command data or dot pattern data;

first receiving means for receiving the command data, at the first speed, at the communication means from the external apparatus when the identifying means identifies the command data;

second receiving means for receiving the dot pattern data, at a second speed greater than the first speed, at the communication means from the external apparatus when the identifying means identifies the dot pattern data;

buffer means for storing the dot pattern data received at the second speed; and means for printing an image on a paper based on the dot pattern data from the buffer means.

* * * * *